United States Patent [11] 3,613,720

| [72] | Inventor | Elmer Scott Welch |
| | | Silver Lake, Wis. |
| [21] | Appl. No. | 794,205 |
| [22] | Filed | Jan. 27, 1969 |
| [45] | Patented | Oct. 19, 1971 |
| [73] | Assignee | G & H Products, Inc. |
| | | Kenosha, Wis. |

[54] CHECK VALVE ASSEMBLY
4 Claims, 3 Drawing Figs.
[52] U.S. Cl. .................................................. 137/527.8,
 137/525.3, 137/527.2, 137/527
[51] Int. Cl. ................................................... F16k 15/14
[50] Field of Search .......................................... 137/527.8,
 525.7, 525.3, 527.4, 527; 251/362, 331

[56] References Cited
UNITED STATES PATENTS
| 1,925,392 | 9/1933 | La Bour | 137/525.7 |
| 1,992,495 | 2/1935 | Lynde | 137/525.7 |
| 3,465,786 | 9/1969 | Spisak | 137/525.3 |
| 254,227 | 2/1882 | Martin | 137/525.7 |
| 1,488,831 | 4/1924 | Prall | 137/525.7 |
| 1,829,666 | 10/1931 | Minster | 137/527.8 |
| 3,128,785 | 4/1964 | Krummel | 137/525.3 |
| 3,292,653 | 12/1966 | Scaramucci | 137/527.8 |
| 627,473 | 6/1899 | Boyer | 251/362 |

Primary Examiner—Laverne D. Geiger
Assistant Examiner—William H. Wright
Attorneys—John W. Michael, Gerrit D. Foster, Bayard H. Michael, Paul R. Puerner, Joseph A. Gemignani, Andrew O. Ritieris and Spencer B. Michael ABSTRACT: A check valve assembly comprising an inlet body, a valve plug assembly and an eccentric reducing outlet body. The inlet and outlet bodies are removably connected together with the valve plug assembly mounted between the two body portions. The valve plug assembly is preferably of rubber material and is comprised of a circular gasket portion and a centrally disposed flapper valve portion formed integrally with each other. The gasket portion serves to seal the connection between the inlet and outlet bodies, and the flapper valve portion is comprised of a swingable valve member connected to the gasket portion by a pair of hinge portions located at the top portion of the valve member. The inlet body has a seat formed thereon against which the swingable valve member is adapted to seat and thereby block flow from the outlet to the inlet. Such swingable valve member is also adapted to swing upwardly away from the seat to allow flow from the inlet to the outlet. The flapper valve is provided with a metal core member molded into the valve member which serves as a weight to aid in the closing action of the valve.

PATENTED OCT 19 1971 3,613,720

Inventor
ELMER S. WELCH

By Paul R. Puerner
Attorney

CHECK VALVE ASSEMBLY

BACKGROUND OF INVENTION

1. Field of Invention

This invention relates to a check valve assembly and more particularly to a so-called sanitary check valve designed for use in the dairy industry.

2. Description of Prior Art

There have been a number of proposals for sanitary check valves of the type involved herein. One of the principal problems of prior art designs is the relative difficulty of maintaining proper sanitary conditions inside the valve structure. In this regard, it is desirable that the parts be few in number and be designed so as to avoid areas where foreign matter can collect and create cleaning problems. It is also important that the valve assembly be easily and quickly disassembled for periodic inspection of the internal surfaces. Other considerations involved are problems of vibration, valve sticking and the attribute of free draining. The present invention provides a very effective solution to the above-outlined problems inherent in prior art constructions.

SUMMARY OF INVENTION

The objects of this invention are provided by a check valve assembly comprising a valve inlet body having a valve seat formed thereon and an outlet body adapted for removable connection to the inlet body. A valve plug assembly is mounted between the inlet and the outlet bodies and includes a centrally disposed flapper valve portion adapted to swing between a closed position in which the valve member is seated against the valve seat and an open position in which flow from the inlet to the outlet can freely occur. The valve plug assembly is further characterized by a circular gasket portion made integral with the flapper valve portion and connected thereto by a pair of spaced hinge portions. Such gasket portion serves to seal the connection between the inlet and outlet bodies. In addition, the swingable valve member includes a core member mounted thereon which serves as a weight to aid in the closing action of the valve. The core member is preferably of metal material and overlaps the seat on the inlet body to provide a physical barrier to prevent the valve member from being forced back past the seat should an excessively high pressure condition occur in the outlet body. The lowermost portion of the valve seat on the inlet body is located closely adjacent the lowermost portions of the inlet and outlet bodies to facilitate substantially complete drainage of the valve when desired. The inlet and outlet valve body portions can be readily disassembled to thereby expose the entire interior portions of the valve structure for periodic inspection. The valve structure is compact requiring a minimum of space for installation and the parts of the valve assembly are relatively inexpensive and lend themselves to mass production manufacturing techniques.

DESCRIPTION OF PREFERRED EMBODIMENT

The sanitary check valve of this invention is comprised of three basic parts which, for purposes of this specification, are identified as a valve seat inlet body 10, a valve plug assembly 12 and an eccentric reducing outlet body 14.

Figure 1:
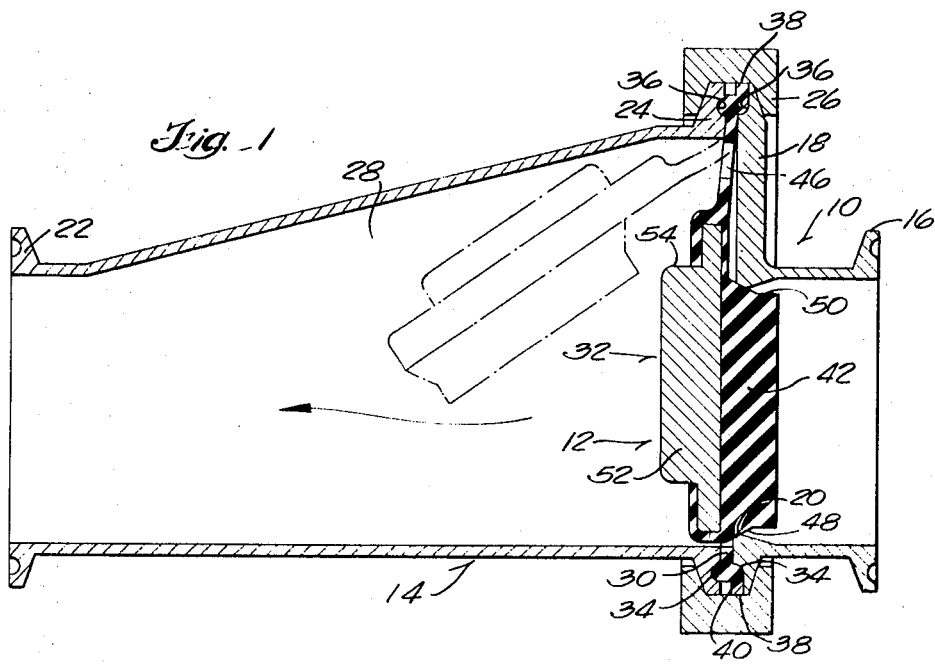
FIG. 1 is a vertical sectional view of the sanitary check valve assembly of this invention.
Figure 2:
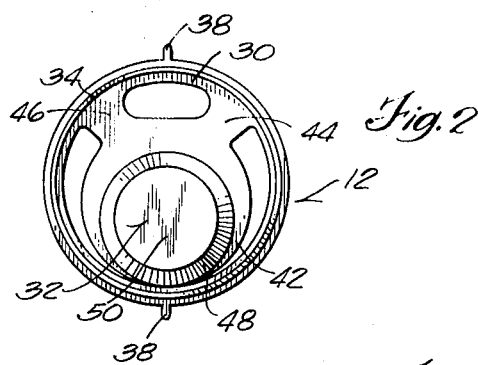
FIG. 2 is an elevation view of one face of the plug valve assembly.
Figure 3:
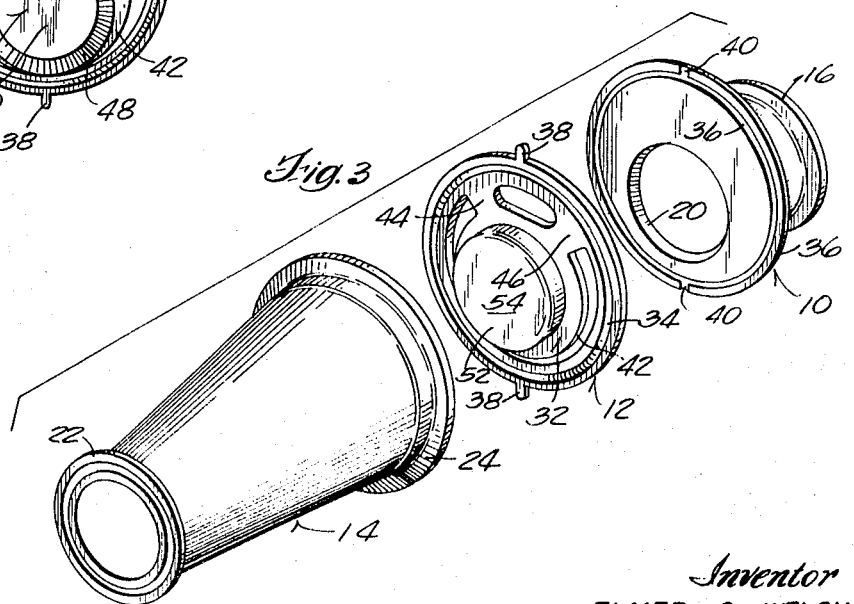
FIG. 3 is an exploded perspective view showing the three basic components of the sanitary check valve assembly.

Valve seat inlet body 10 has a flanged inlet 16 adapted for connection into a pipeline (not shown) and a flange 18 of larger diameter adapted for removable connection to eccentric reducer outlet body 14 as shown in FIG. 1. Inlet body 10 is also provided with an inwardly tapered valve seat surface 20 located concentrically with respect to flanged inlet 16.

Eccentric reducer outlet body 14 is provided with a flanged outlet 22 corresponding in size to flanged inlet 16 and a flange 24 of larger diameter adapted for removable connection to flange 18 of inlet body 10 by means of a removable clamping member 26 of any suitable design. The tapered shape of reducer outlet body 14 provides an internal space 28 in the upper portion thereof, the purpose of which will be explained hereinafter.

When used in the dairy industry, the valve body sections 10 and 14 and clamp 26 are preferably of stainless steel material.

Valve plug assembly 12 is comprised of a circular gasket portion 30 and a centrally disposed flapper valve portion 32 formed integrally with each other. Gasket portion 30 is provided with oppositely extending sealing ribs 34 which seat in grooves 36 of flanges 18 and 24 in a conventional manner to seal the joint between body sections 10 and 14 when in assembled position (FIG. 1). Gasket portion 30 is also provided with a pair of locating tabs 38 adapted for engagement in notches 40 on flange 18 to insure and maintain proper alignment between valve plug assembly 12 and the seat 20 on inlet body 10.

Flapper valve portion 32 of plug assembly 12 is comprised of a swingable valve member 42 connected to gasket portion 30 by a pair of hinge portions 44 and 46 located at the top portion of the valve. Valve member 42 is formed with a tapered face 48 adapted to seat against seat surface 20 on inlet body 10 and a cylindrical portion 50 which extends from face 48 into inlet body 10 when in closed position as shown in solid lines in FIG. 1. Cylindrical portion 50 is concentric with seat 20 and of slightly smaller diameter, and serves as a "centering means" to insure proper seating of valve member 42 on valve seat 20.

Flapper valve portion 32 is also provided with a core member 52 preferably of metal which serves as a weight to aid in the closing action of the valve. Core 52 is in the form of a circular disk having a concentric cylindrical extension 54 formed on the external face thereof. As clearly shown in FIG. 1, core 52 is molded into the body of valve plug assembly 12 which body is preferably made from a suitable rubber material. It is also noted that the outer periphery of core member 52 extends beyond or overlaps seat surface 20 for a reason which will be explained hereinafter.

In operation, the flow of liquid from inlet body 10 to outlet body 14 (see arrow, FIG. 1) will cause flapper valve 32 to swing upwardly into space 28 on hinges 44,46 to a position like that shown in dotted lines in FIG. 1. In such position, liquid will flow freely through the valve assembly.

When flow is discontinued or when reverse flow occurs, flapper valve 32 will swing back into its closed position wherein tapered valve face 48 will move into sealing engagement with valve seat 20. It is important to note at this point that by the use of a pair of hinge portions 44 and 46 for supporting valve member 42, accurate alignment is maintained between seat 20 on body 10 and valve face 48 on valve member 42. Experience has shown that this double hinge arrangement provides a more stable operation and provides better seating between the parts than if only a single hinge were employed.

The metal core member 52 molded into flapper valve 32 provides a weight which facilitates the closing action of the valve 32 by the force of gravity. In addition, the overlapping arrangement of core 52 with respect to seat 20 not only provides a substantially uniformly applied sealing force, but also provides a physical barrier to prevent the rubber flapper valve 32 from being forced back past seat 20 into body 10 should an excessively high pressure condition occur in outlet body 14.

Due to the eccentric construction of body sections 10 and 14 it is possible to locate the lowermost part of flapper valve 32 almost directly adjacent the bottom of body sections 10 and 14. This relationship provides a valve assembly which is almost one hundred percent "free draining" which feature is important in the sanitary check valve art.

The three basic parts of the assembly can be readily disassembled for inspection, replacement and repair which is also an important consideration in a "sanitary" check valve.

Finally, it is noted that the valve assembly of this invention employs only a small number of easily assembled and disassembled parts which can be economically mass-produced. The result is a product which provides superior operating characteristics at a lower cost than prior valves of this type.

Although but one embodiment of the present invention has been illustrated and described, it will be apparent to those skilled in the art that various changes and modifications may be made therein without departing from the spirit of the invention or from the scope of the appended claims.

We claim:

1. A check valve assembly comprising:

a valve inlet body having a valve seat formed therein;

an outlet body adapted for removable connection to said inlet body; and a valve plug assembly mounted between said inlet body and said outlet body, said valve plug assembly including a centrally disposed flapper valve portion comprising a swingable valve member adapted to swing between a closed position in which said valve member is seated against said valve seat and an open position in which flow from said inlet body to said outlet body can occur, said valve plug assembly further welding a circular gasket portion made integral with said flapper valve portion and connected thereto by a pair of spaced hinge portions made integral with said flapper valve portion and said gasket portion, said gasket portion serving to seal the connection between said inlet and outlet bodies.

2. A check valve assembly according to claim 1 in which said gasket-portion is provided with a locating-tab means adapted for engagement with a notch means on said inlet body to maintain proper alignment between said valve plug assembly and said seat formed on said inlet body.

3. A check valve assembly according to claim 1 in which said seat on said inlet body is located eccentrically of said outlet body to provide a space into which said flapper valve can swing when flow occurs from said inlet to said outlet body.

4. A check valve assembly according to claim 3 in which the lowermost portion of said seat on said inlet body is located closely adjacent the lowermost portions of said inlet and outlet bodies to facilitate substantially complete drainage of the valve when desired.